US007016853B1

(12) United States Patent
Pereless et al.

(10) Patent No.: US 7,016,853 B1
(45) Date of Patent: Mar. 21, 2006

(54) METHOD AND SYSTEM FOR RESUME STORAGE AND RETRIEVAL

(75) Inventors: John J. Pereless, Leonardo, NJ (US); Christopher N. McCrae, Oceanport, NJ (US)

(73) Assignee: Openhike, Inc., Winston-Salem, NC (US)

( * ) Notice: Subject to any disclaimer, the term of this patent is extended or adjusted under 35 U.S.C. 154(b) by 457 days.

(21) Appl. No.: 09/665,757

(22) Filed: Sep. 20, 2000

(51) Int. Cl.
*G06F 17/60* (2006.01)

(52) U.S. Cl. ......................................................... 705/1
(58) Field of Classification Search ...................... 705/1
See application file for complete search history.

(56) References Cited

U.S. PATENT DOCUMENTS

| | | | |
|---|---|---|---|
| 5,164,897 A | * 11/1992 | Clark et al. ..................... 705/1 |
| 5,659,732 A | 8/1997 | Kirsch |
| 5,748,954 A | 5/1998 | Mauldin |
| 5,751,956 A | 5/1998 | Kirsch |
| 5,758,324 A | 5/1998 | Hartmann et al. |
| 5,832,497 A | * 11/1998 | Taylor ..................... 707/104.1 |
| 5,847,708 A | 12/1998 | Wolff |
| 5,848,396 A | 12/1998 | Gerace |
| 5,855,020 A | 12/1998 | Kirsch |
| 5,860,071 A | 1/1999 | Ball et al. |
| 5,870,546 A | 2/1999 | Kirsch |
| 5,870,740 A | 2/1999 | Rose et al. |
| 5,884,270 A | * 3/1999 | Walker et al. .................. 705/1 |
| 5,890,164 A | 3/1999 | Nielsen |
| 5,903,729 A | 5/1999 | Reber et al. |
| 5,907,837 A | 5/1999 | Ferrel et al. |
| 5,920,854 A | 7/1999 | Kirsch et al. |
| 5,924,090 A | 7/1999 | Krellenstein |
| 5,956,486 A | 9/1999 | Hickman et al. |
| 5,978,768 A | 11/1999 | McGovern et al. |
| 6,052,122 A | * 4/2000 | Sutcliffe et al. ............ 345/751 |
| 6,088,717 A | 7/2000 | Reed et al. |
| 6,260,041 B1 | 7/2001 | Gonzalez et al. |
| 6,263,361 B1 | 7/2001 | Hoyer et al. |
| 6,266,659 B1 | * 7/2001 | Nadkarni ......................... 707/3 |
| 6,272,467 B1 | * 8/2001 | Durand et al. .................. 705/1 |
| 6,363,376 B1 | * 3/2002 | Wiens et al. .................... 707/3 |
| 6,381,592 B1 | * 4/2002 | Reuning ......................... 707/3 |
| 6,385,620 B1 | * 5/2002 | Kurzius et al. ........... 707/104.1 |
| 2001/0034630 A1 | * 10/2001 | Mayer et al. ................... 705/7 |
| 2001/0042000 A1 | * 11/2001 | Defoor, Jr. ...................... 705/9 |
| 2002/0026452 A1 | * 2/2002 | Baumgarten et al. ..... 707/104.1 |
| 2002/0046074 A1 | * 4/2002 | Barton ............................ 705/8 |
| 2002/0055870 A1 | * 5/2002 | Thomas ........................ 705/10 |
| 2002/0091689 A1 | * 7/2002 | Wiens et al. .................... 707/6 |

FOREIGN PATENT DOCUMENTS

| | | | |
|---|---|---|---|
| JP | 2000057213 A | * | 2/2000 |
| JP | 2002024459 A | * | 1/2002 |
| WO | WO 200104811 A1 | * | 1/2001 |

OTHER PUBLICATIONS www.recruiter.ca, Knowledge Probe Inc., Product links: Resume Detective (www.recruiter.ca/detective/nj.html), IRIS (www.recruiter.ca/recruiter/iris.html), and Recruiter 4 Windows (www.recruiter.ca/recruiter/r4w.html).*
Conhaim, Wallys W., "Employment. (the Internet as an employment resource)," Link–Up, Nov.–Dec. 1998.*
"Employment Publishing Launches Employment911.com to Provide No–Cost, One–Stop Solution for Job Seekers, Employers and Recruiters," PR Newswire, Apr. 1, 2000.*
"PowerAdz.com Partners with CareerSite to Offer Online Job Search and Recruitment Solution to over 1,400 Newspaper Affiliates." Business Wire, Jun. 19, 2000.*
http://www.NorthernLight.com.
http://www.NorthernLight.com/doc/custom/folders.html.

* cited by examiner

*Primary Examiner*—John G. Weiss
*Assistant Examiner*—Jonathan Ouellette
(74) *Attorney, Agent, or Firm*—Steven B. Kelber; DLA Piper Rudnick Gray Cary US LLP (57) ABSTRACT

This a method and system for resume storage and retrieval from multiple resume warehouses. The method system allow recruiters to collect and organize job applicant information gathered from multiply resume warehouses and store them local to a service provider.

26 Claims, 11 Drawing Sheets

```
OpenHire Custom Browser
WWW.INFOWORKSUSA.COM   [Reload] [Stop] [Save] [Forward]
OpenHire              [Capture] [Accept] [Decline] [Close]
```

The Draft Page, This Will not be saved

```
    Objective<br>
Full-time permanent position in Windows NT/Microsoft SQL Server
implementation and administration.<br>
<br>
Summary of Qualifications<br>
Seven years of experience in the installation, configuration, and
administration of Microsoft Windows NT networks and Microsoft SQL
servers in a high-volume multi-user environments. Proficient in
coding SQL scripts to automate SQL server maintenance, backups
and disaster recovery. Experienced in planning and implementing
```

Parsed by: INFOWORKSUSA template

| | |
|---|---|
| Job Title: (required) | —no job applicable— |
| Name: (required) | |
| Address: | |
| Address: | |
| City: | Fairfax |
| State: (required) | VA |
| Country: | US |

FIG. 7A

| OpenHire Custom Browser | | |
|---|---|---|
| -- Local File -- | | |

| | |
|---|---|
| Zip Code: | 08053 |
| Email: | c...... |
| Phone: (required) | (856)983-1260 |
| Work Phone: | |
| Years of Experience: | 0 |
| Job Type: | |
| Willing to Relocate? | No  If so, Preference? [Will not Relocate / Anywhere in US / International / Alabama] |
| Salary Requirement: | (ie: $15,000/yr., $15.00/hr.) |
| US Citizen? | Yes  If no, Visa Type? Select Visa Type |
| Date Available: | ie: (05/31/00) |

Resume (Block Text)

```
Summary
Seeking for a technique oriented job career in IT industry as
C /JAVA Developer,
or Networking experience.
```

METHOD AND SYSTEM FOR RESUME STORAGE AND RETRIEVAL

BACKGROUND OF THE INVENTION

1. Field of the Invention

The invention relates to a method and system for resume storage and retrieval from multiple resume warehouses. More specifically, the invention relates to a method and system to allow clients/recruiters to collect and organize job applicant information gathered from multiply resume warehouses.

2. Description of the Related Technology

Resumes are a primary communication medium between employers and job applicants. Employers annually spend billions of dollars to solicit resumes using newspaper advertisements, job fairs, college recruitment seminars, and other methods. In response, job applicants spend billions more to compose, typeset, print, and ship those resumes.

Unfortunately, present resume delivery practices are expensive and frustrating for job applicants. Employers and applicants suffer from the inefficiencies of resume collection and handling. The solicitation, receipt, storage, management, search, and retrieval of dozens, hundreds, and in some cases thousands of resumes can be a difficult, unwieldy, and expensive burden on the employer. Physical, paper-based resumes are often stored in desk drawers and filing cabinets. The numerous limitations of present resume practices include consumption of substantial physical space; difficulty in searching through large quantities of paper documents; the near-impossibility of correlating applicants whose resumes may vary widely in organization, content, and clarity; and the lack of uniformity in the search process from one practitioner to another.

Figure 3:
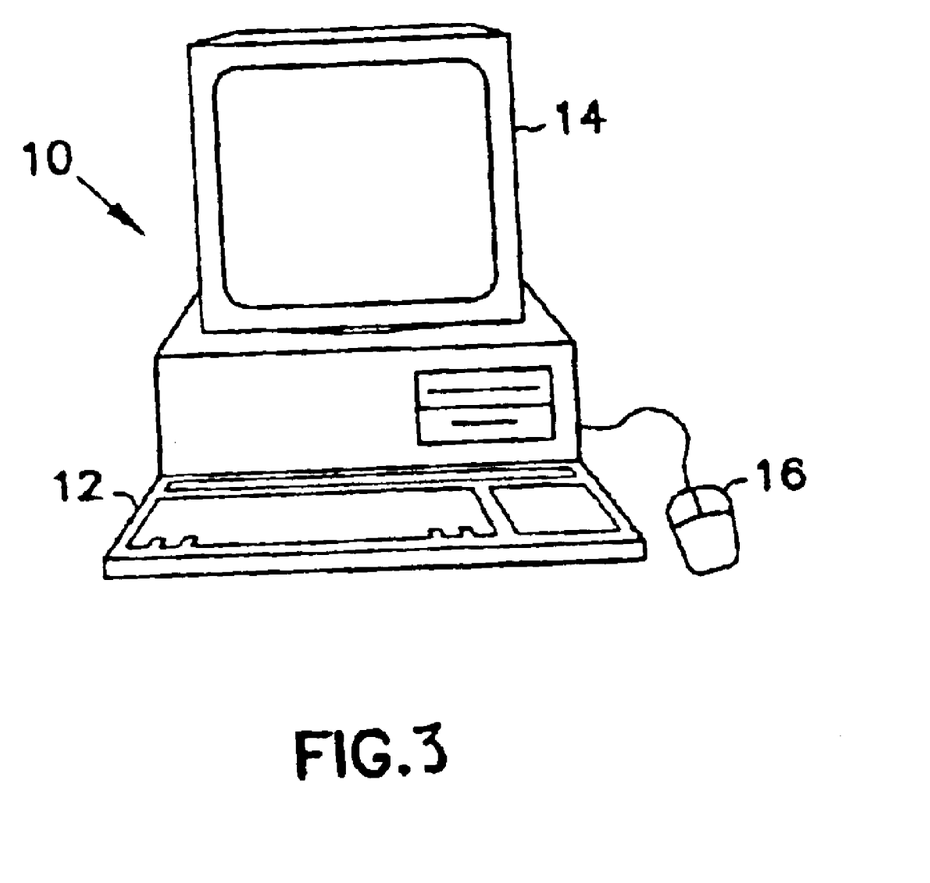
FIG. 3 shows another embodiment of the invention

The growing popularity oft he Internet has created a niche in the resume distribution business for Internet resume warehouses (for example, Monster.com, Hotjobs.com, Dice) to improve the method of resume solicitation, sorting, delivery, handling, and management. In U.S. Pat. No. 5,758, 324 issued to Hartman et al. (incorporated by reference), a resume warehouse is described that allows a job applicant to fill out a resume outline form 30 (FIG. 3). The form 30 has a plurality of fields 31 relevant to employment, using typical information found on a resume is summarized by the applicant. Another resume warehouse is described in U.S. Pat. No. 5,978,768 to McGovern et al. (incorporated by reference), which enables an employer to use a computer network, such as the Internet, to advertise available positions and receive resumes electronically from prospective applicants, and enables prospective applicants to use the Internet to find those available positions.

Therefore, a continuing need exists for a system which will maximize the scope of a company's advertising efforts while also providing a reasonably secure and efficient manner of forwarding resumes to the company and enabling the company to efficiently screen and categorize the resumes received. Additionally, a continuing need exists to assist a job seeker in locating available positions quickly and effectively.

SUMMARY OF THE INVENTION

From the above discussion, it is clear that a very significant need exists for an improved method of resume sorting, delivery, handling, and management.

The invention relates to a method and system for resume storage and retrieval from multiple resume warehouses. More specifically, the invention relates to a method to allow recruiters to collect and organize job applicant information gathered from multiply resume warehouses.

On-line resume warehouses have grown in popularity as a means to cut recruiting cost. Each warehouse has a different method for formatting the job applicant information. Currently, recruiters may print out resume of interest or cut and paste them into a word processing application. Since recruiters may be receive a large amount of resumes, the task of organizing and screening those resumes may be particularly burdensome and thus, a certain resume may be overlooked or mishandled. Furthermore, the electronic storage requirements may be overwhelming for a business technology resources.

The invention provides a method and apparatus for storage and retrieval of resume information from multiple resume warehouses.

The invention provides a method and apparatus for searching multiple resume warehouses for resumes and collecting information regarding the resume in a service providers database.

The invention provides a method of and apparatus for storage and retrieval of resume information in a manner which preserves the appearance, organization, and information content of the original document.

One embodiment of the invention provides a method of and apparatus for parsing the resume information and storing the resume information in a database.

One embodiment of the invention provides a method of and apparatus for computer-assisted searching of the resume information.

One embodiment of the invention provides a method of and apparatus for enabling the automatic and continuous execution oft he searches through resume warehouses, thereby determining when a potentially qualifying applicant has entered their resume.

One embodiment of the invention provides a method of and apparatus for coordinating the parsing of resume information from multiple resume warehouses.

Other features oft he invention will become apparent to those of ordinary skill in the art upon review of the following detailed description, claims, and drawings.

An object of the present invention is to provide a method and apparatus which enables an individual to search multiple on-line databases for resumes from prospective candidates, and allows the individual to capture and efficiently organize and screen the capture resumes.

DETAILED DESCRIPTION OF THE PREFERRED EMBODIMENT

Figure 1:
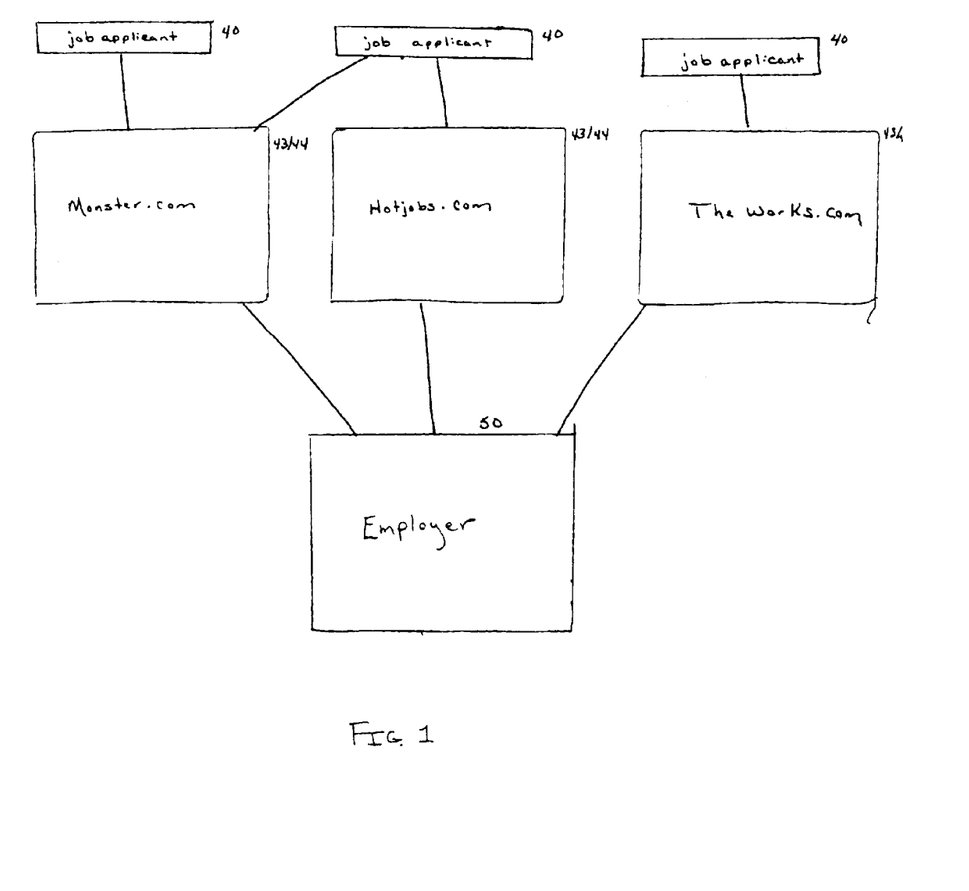
FIG. 1 shows an embodiment of the invention

FIG. 1 shows the a prior art on-line resume storage and retrieval system. An employer may link to a resume warehouse (for example, Monster.com, Hotjobs.com, Dice) and search the warehouse's database for resumes. Once the employer finds a resume that meets the required qualifications, the employer may print out a copy of the resume or electronically cut and paste the document into a word processor application. The resume may then be filed away or stored on the employer's computer system. This method has many disadvantages, such as the resumes must be manually organized and screened, the resumes require a large portion of the employers' computer resources for storage.

This method is inefficient even after the resumes are received by the company. For example, because the resumes must be manually organized and screened, a person in the company's recruitment or human resources department may need to spend a significant amount of time every day performing this task. Due to the large amount of resumes that may be received, the task of organizing and screening those resumes may be particularly burdensome and thus, a certain resume may be overlooked or mishandled. As a result, a candidate who is well suited for a position may never be considered.

Another disadvantage of the prior on-line resume storage and retrieval systems is a client/recruiter may utilize more than one resume warehouse. Each resume warehouse may have a different method or format for supplying an employer with job applicant information. The different methods or formats may make it difficult for an employer to import and manage the resume information from different resume warehouse sources. The present invention overcomes this disadvantage by providing a method and apparatus that allows employers to import and managing job applicant information from multiple resume warehouse.

Another disadvantage is prior systems do not provide an employer the ability to track the efficiency of each resume warehouse at generating potential job candidates. Currently, there is a need to track each resume warehouse to determine the number of resumes supplied to a client, the number of job candidates generated and the number of hires generated. Furthermore, the present invention may notify a client when a resume is already stored in the client's database located at the service provider's site. This will eliminate paying and storing for multiple copies of a resume. In addition, the present invention eliminates false efficiency counts for a resumes warehouses.

In an alternative embodiment, the method and apparatus may allow a client to accept resumes: from a headhunter. The resumes submitted by a headhunter may be added to the client's database located at the service provider's site. A client may use the method and apparatus to track the productivity a headhunter. The present system may track a head hunter to determine the number of resumes supplied to a client, the number of job candidates generated and the number of hires generated. If a headhunter attempts to submit a resume to a client's database and the resume is already stored in the client's database located at the service provider's site, the system may automatically notify the client and/or headhunter that the resume exist and that no commission will be paid for the resume submission. This method reduces or eliminates any confusion regarding commissions paid to the headhunters. Since headhunters charge a substantial fee for their services, this is an important advantage of the present invention.

Figure 2:
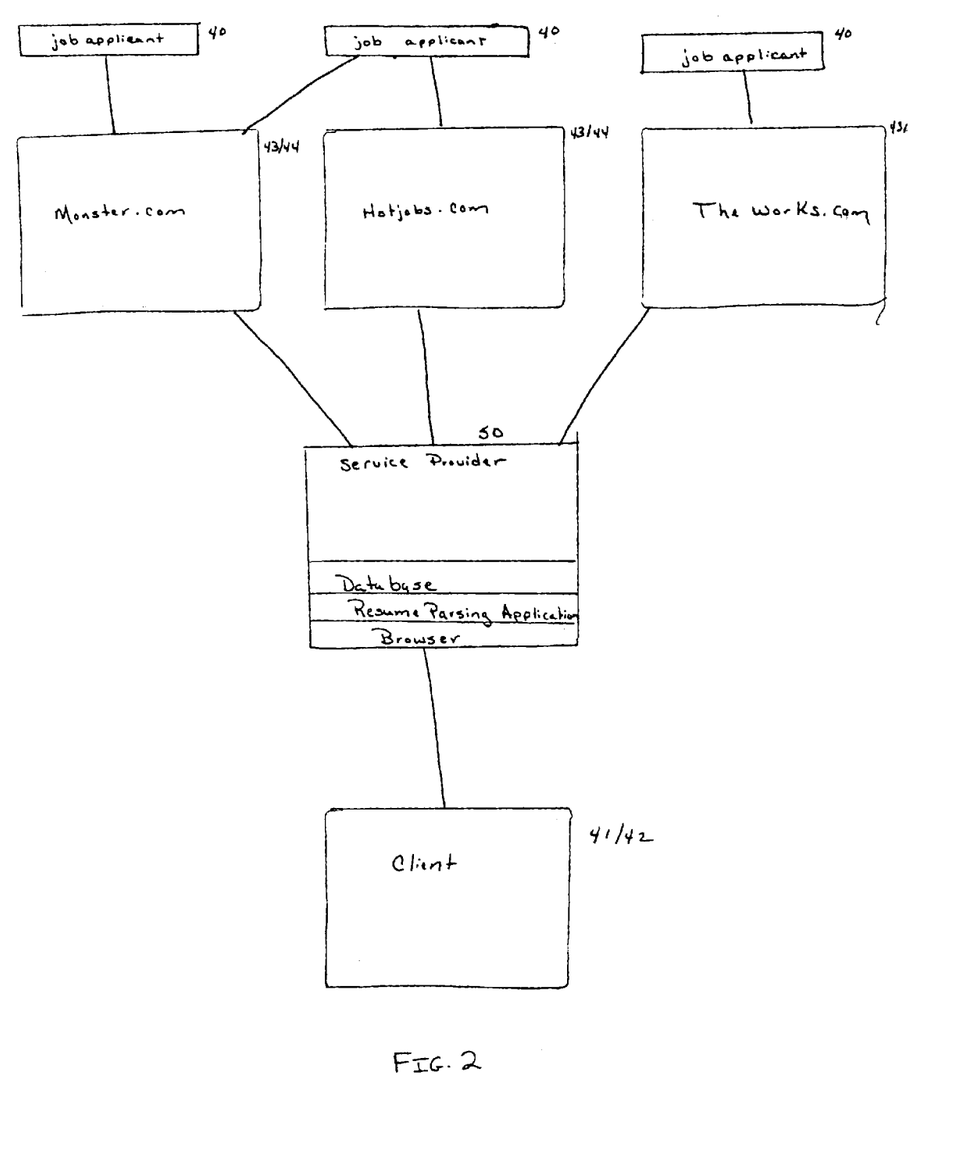
FIG. 2 shows another embodiment of the invention

An overview of an embodiment of the present invention is illustrated in FIG. 2. This figure illustrates a relationship between computers 40 used by job applicants searching for employment positions; an employer, recruiter or company 41 having a computer 42 (it is understood that more than one employer, recruiter or company may use the present invention); a resume database 43; and a service provider 50. The resume database 43 may be maintained by a resume warehouse, which typically has contractual relationships with the employers, or companies 41 (may be a headhunter or recruiter). Each node in FIG. 2 (job seeker computer 40, company computers 42, resume warehouse 43 and service provider 50) is provided with suitable communication links and communications software so that they may communicate with each other.

Various possible types of communication links may be employed for the communication links between the nodes of FIG. 2. For example, the communication link may comprise a hard wired connection, a telephone connection, a satellite RF, or other wireless connection, an Internet connection, a local area network or wide area network connection, a combination of the preceding, or any other desired type of connection. Different machines can connect using different types of communication links.

The computers may be workstations, desktop computers, laptop computers, mobile computers, PDAs, servers, clients, peers, uniprocessor or multiprocessor machines, embedded systems, and/or other computers. Suitable networks include local area networks, metropolitan area networks, wide area networks, the Internet, or any combination thereof "Internet" as used herein includes variations such as a private Internet, a secure Internet, a value-added network, a virtual private network, a portion oft he Internet such as the World Wide Web, or an intranet. If an Internet connection is used, some security precautions may be taken in an embodiment of the invention. For example, a secure servers or encryption methods may be used.

The operations performed by a company computer 42 running computer software according to an embodiment of the present invention will now be described. A diagram of a typical computer on which the present invention is implemented is shown in FIG. 3. Computer 10 usually includes keyboard 12, display device 14 and pointing device 16. Computer 10 has a program running thereon in accordance with the present invention. Display device 14 can be any of a number of different devices, such as a computer monitor employing a cathode ray tube (CRT) or touch screen. Pointing device 16 as shown in FIG. 3 is a mouse, although the invention is not so limited.

Figure 4:
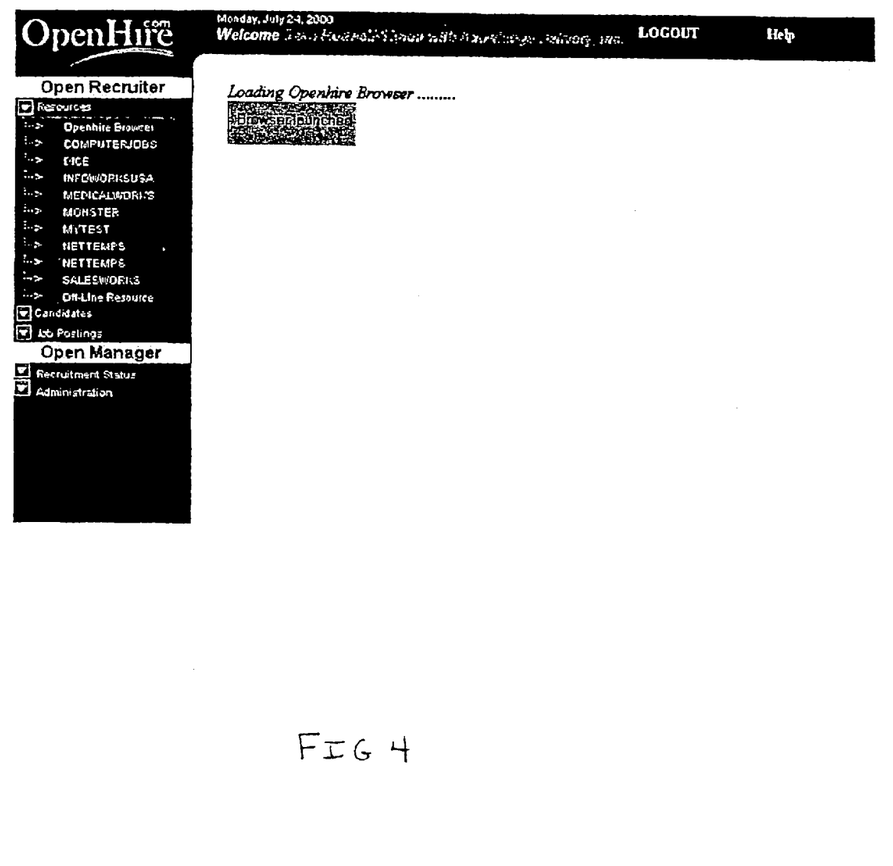
FIG. 4 shows another embodiment of the invention

When a client connects to the service provider's web site, the service provider may display a screen requesting that the client enter his or her name, pseudonym, or the like, and password, which allows the client to interact with or "log-on" to the service provider's web site. In an alternative embodiment, the client is not required to log-on. Once a client has log-on, the service provider may display interactive screens that allow the client to perform desired tasks to administrate or facilitate the hiring process. The service provider 50 may provide the client's machine 41 with a web page allowing the client to select a resume warehouse for searching for job applicants. As shown in FIG. 4, the client may select an icon, as shown which consists of a very thin rectangular grey colored icon with the resume warehouse name used to represent a link. The invention is not limited by the size, shape or type of icon. The icon shown is for illustrative purposes only. By selecting the icon representing a resume warehouse, a client may link to the resume warehouse though the service provider's custom browser/client program. The service provider may provide automatic login features for the resume warehouses that require passwords. The client may then search for job applicants at the resume warehouse site. In this embodiment, the visual image of the resume warehouse web page may be perservered within the service provider's custom browser. The present invention eliminates any problems regarding the display of the resume warehouse's advertisement banners.

It is noted that the use of the term "selected" or its derivatives in this application refers to selection by manipulation of a mouse, depression of the "enter" key on a computer keyboard, activation of a touch screen, or in any manner as would readily be appreciated by one skilled in the art.

In an alternative embodiment, the service provider may provide a client with ability to search multiple resume warehouses with one search. A list of potential job candidates may be presented to the client. The list of job candidates may be hyperlink to the resume warehouse, which may store the resume information. Aclient may select a job applicant and the resume warehouse's web page, which houses the resume, will open up within the service providers web page (custom browser). This eliminates any problems regarding the display of the resume warehouse's advertisement banners. Another advantage of this embodiment, a client may quickly and efficiently search multiple resume warehouses.

A client may preform a search by known methods. The search may be preformed when a client submits a search form. The search form may include fields corresponding the job requirements. After filling in a search form, the client sends the search form to the service provider/resume warehouse (e.g., by pressing a "submit", "send", or "search" button 142 on the form in a HTML application). This results in the client's machine providing a search request to the service provider/resume warehouse and initiating a search oft he database. The computer running the resume screening software may then be controlled to search those resumes for various attributes, such as college degrees, prior experience, special qualifications, and the like. The computer may then provide a list oft he most qualified candidates out of the entire collection of resumes. Furthermore, the client may enter information indicating that the "search agent" is to be a constant search agent which monitors post for new job applicants on, for example, a daily basis. This computerized screening and sorting method allows human resource personnel to devote more time to other tasks.

The system is capable of storing the client's search requests, and periodically later repeating the search (update searching). If the client desires the ability to store search requests and perform update searches, he or she will be required by the system to obtain a user name and/or password, so the client may be identified by the system in a subsequent connection session.

The system is also capable of suspending execution of a search request upon receiving a suspend request from the client, and of resuming the search at a later time upon receiving a resume request from the client. For example, the client may view the summary information for a certain number of "hits" (entries that satisfy the search parameters) and wish to take a break before more closely studying the results, or before looking at less relevant matches. Again, if the client desires the ability to suspend and later resume search requests, he or she will be required by the system to obtain a user name and/or password, so the client may be identified by the system in a subsequent connection session.

Upon completing the search, client may be provided with an amount of the summary information for entries that satisfy the search parameters (search query). Preferably, contact information (e.g., name, address, phone number, e-mail, fax number, etc.) of qualifying applicants is suppressed at this stage. In one embodiment, the information presented to the employer for each entry that satisfies the search parameters is "summarized" information, for easy and quick review in a standardized, compact, format. Relevancy ranking may be performed in a preferred embodiment. The relevancy ranking identifies entries in the database that, while perhaps not perfectly matching the criteria specified in the search form, are substantially similar enough to be of potential interest to the employer.

Figure 5:
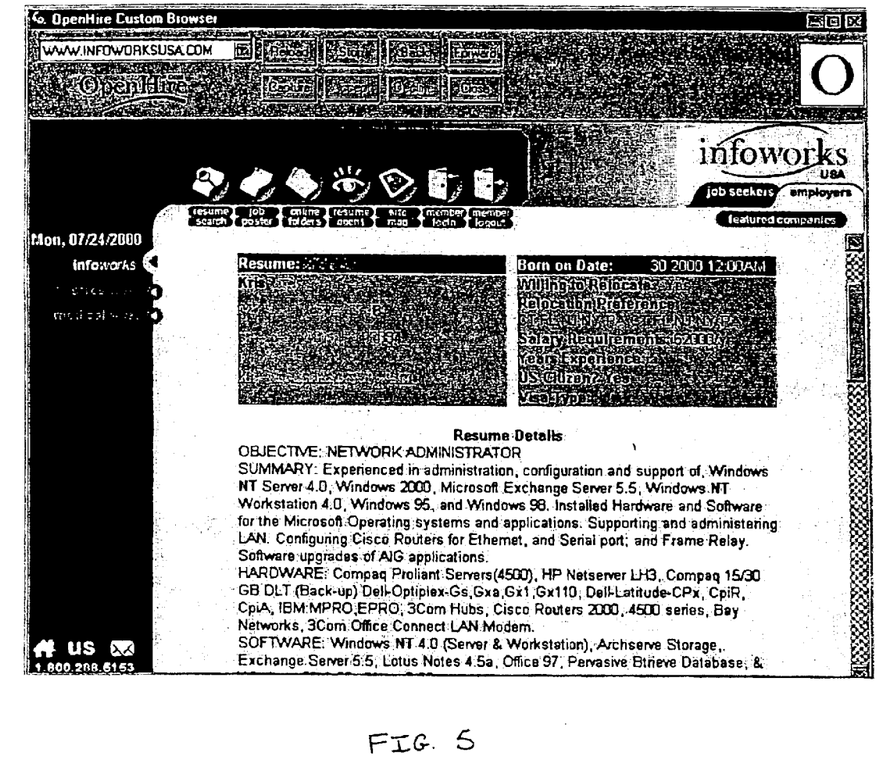
FIG. 5 shows another embodiment of the invention
Figure 6:
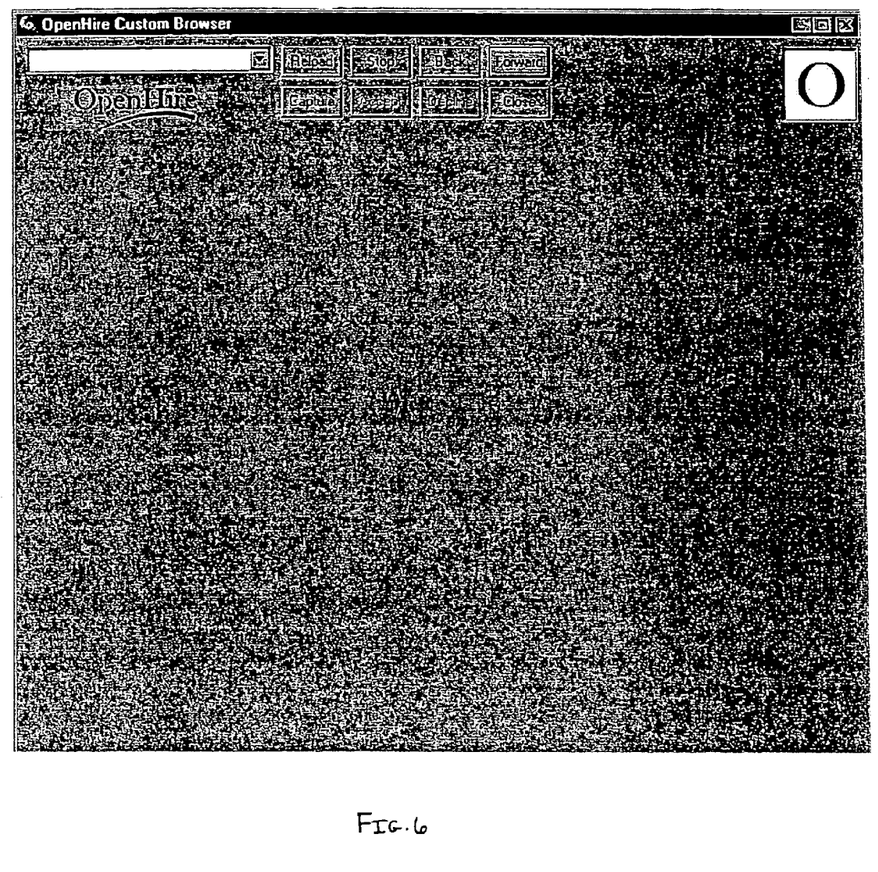
FIG. 6 shows another embodiment of the invention
Figure 7A:
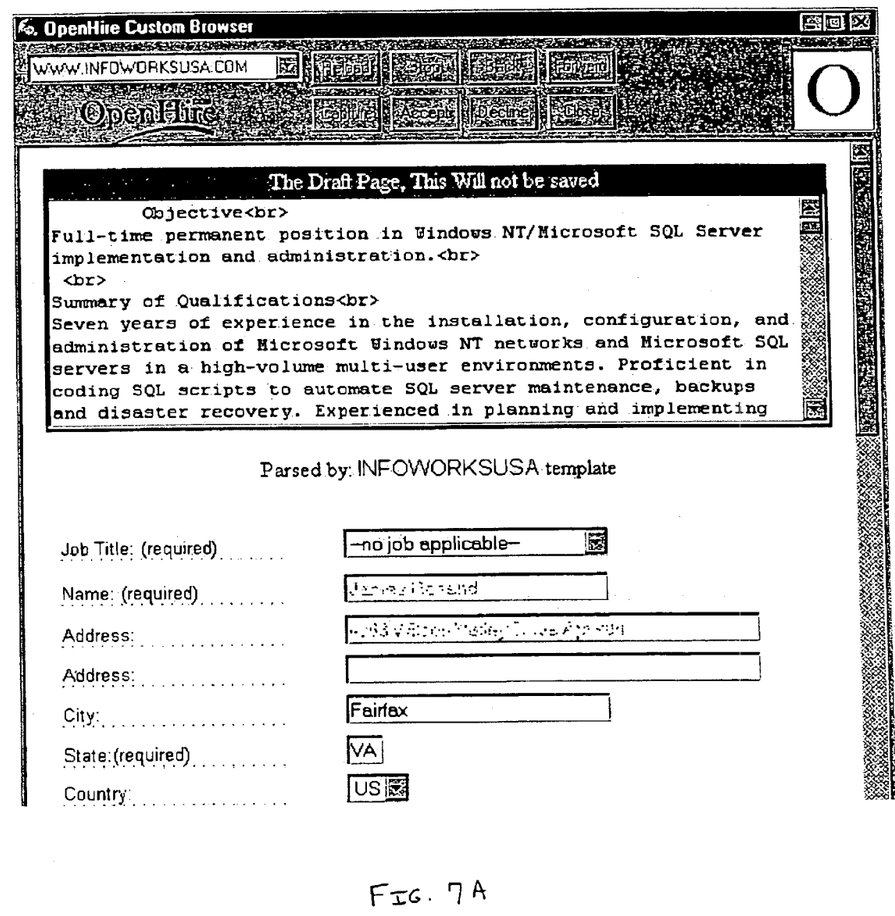
FIG. 7A shows another embodiment of the invention
Figure 7B:
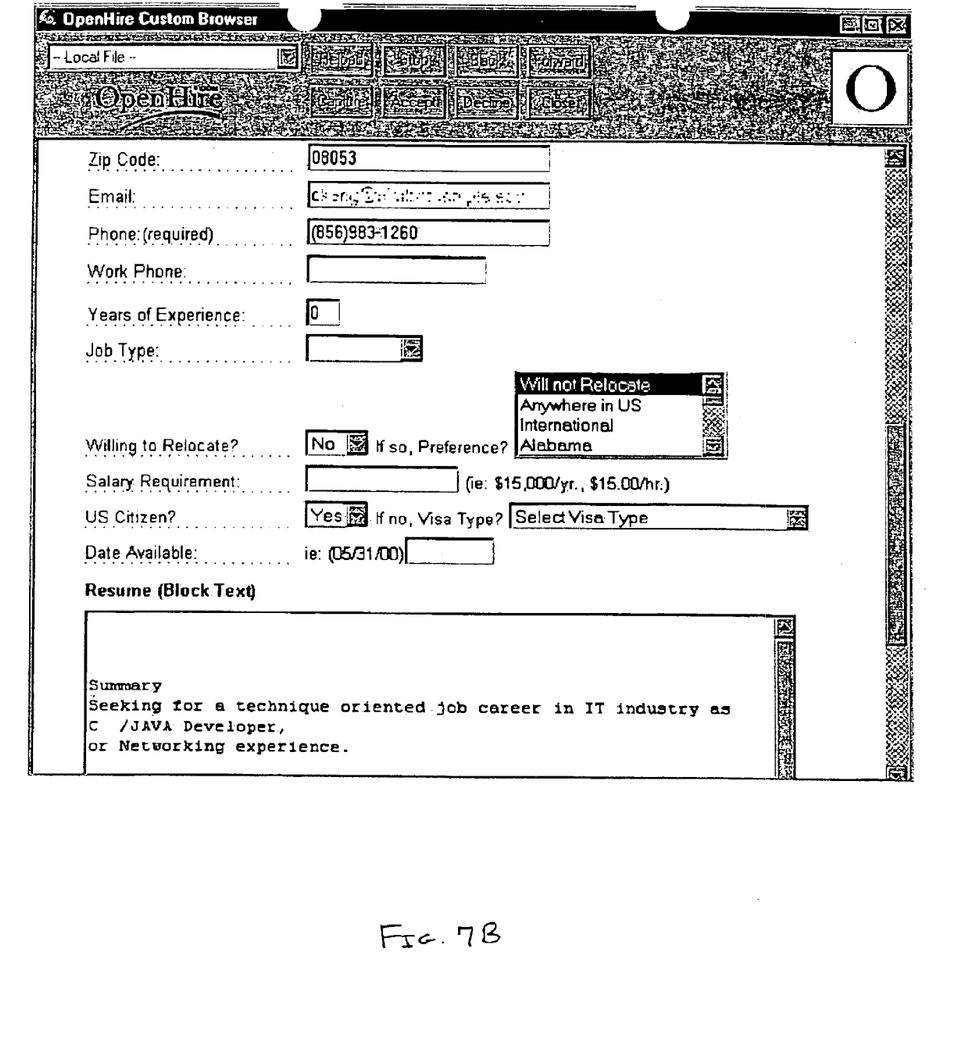
FIG. 7B shows another embodiment of the invention

The list of most qualified candidates may linked to a detail description of the applicant's qualifications as shown in FIG. 5 or an image of the resume may be displayed to the client. If the client wishes to obtain a copy of the resume, the client may click on the capture button shown in FIGS. 5 and 6. The capture button initiates an import application, which parses the resume data from the resume warehouse and collects the data for storage in the service provider's database. Once the data is parsed into the template, the client may chose to accept or decline the applicant information. In an embodiment of the invention, the client my edit the templet before accepting the information. An example of the service provider's templet for parsed job applicant information is shown in FIGS. 7A & 7B. Each resume warehouse may have a different method for formatting the job applicant information. The present invention may be set up to parse the job applicant information from multiple resume warehouses. This method eliminates the client's need to have different storage methods for each resume warehouse. The data from all sources may be maintained in the service provider's database without any extra effort from the client. In an alternative embodiment, an image of the resume may be captured and stored in the database.

When importing the capture resume, the computer software may have the ability to determine the source resume warehouse and a parsing application for the source resume warehouse may be used. By tracking the source resume warehouse, the service may provide the client with the ability to determine the resume warehouse's productivity.

Once a resume has been selected, the client may manipulate the resume as desired. For instance, the client may rate or score the resume to indicate whether the applicant is suitable for the position. The score may appear next to the resume.

After a resume is captured, the job applicant information collected by parsing may be used to populate a database, which may be used to provide an automatic recruiting system. The job applicant information stored in the database may be used to generate form letters. The service provider may be configured to send a message to a prospective job applicant, such as a generate form letter. The message may include for example, the names of the positions and their corresponding companies. The message may be sent via e-mail, facsimile or regular mail. In an alternative embodiment, the service provider may be configured to automatically send an e-mail to the job seeker informing the job seeker that the resume has been received. The client may initiate a form letter to be send to a candidate by selecting the form from the service provider's web site. The service provider may provide the job applicant information to complete the form letter. For example, a letter, such as a form rejection letter may be imported from a database into the e-mail message prior to transmission. In addition, a selected resume may be e-mailed to anyone with an Internet e-mail address.

Figure 8:
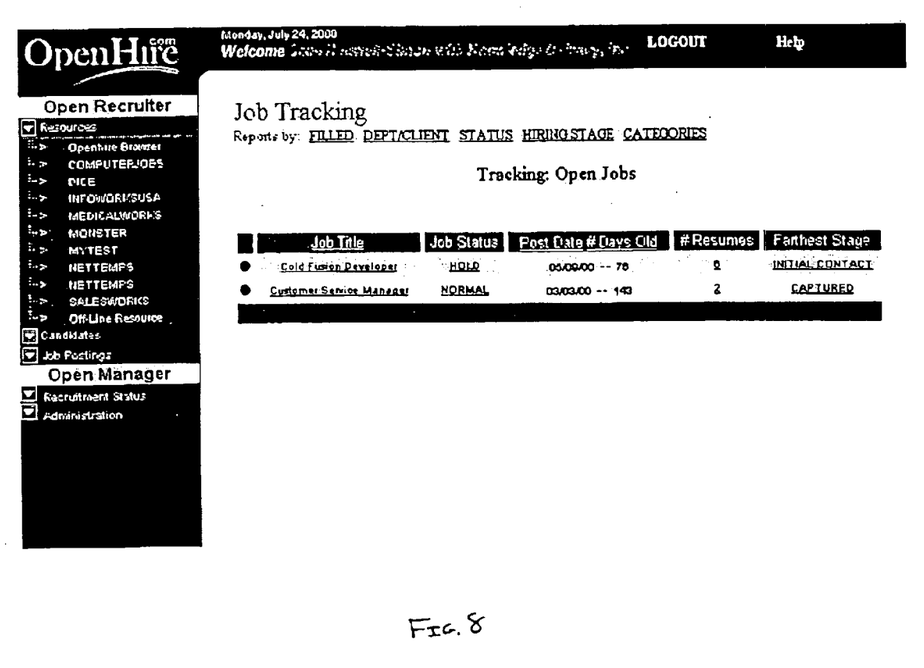
FIG. 8 shows another embodiment of the invention
Figure 9:
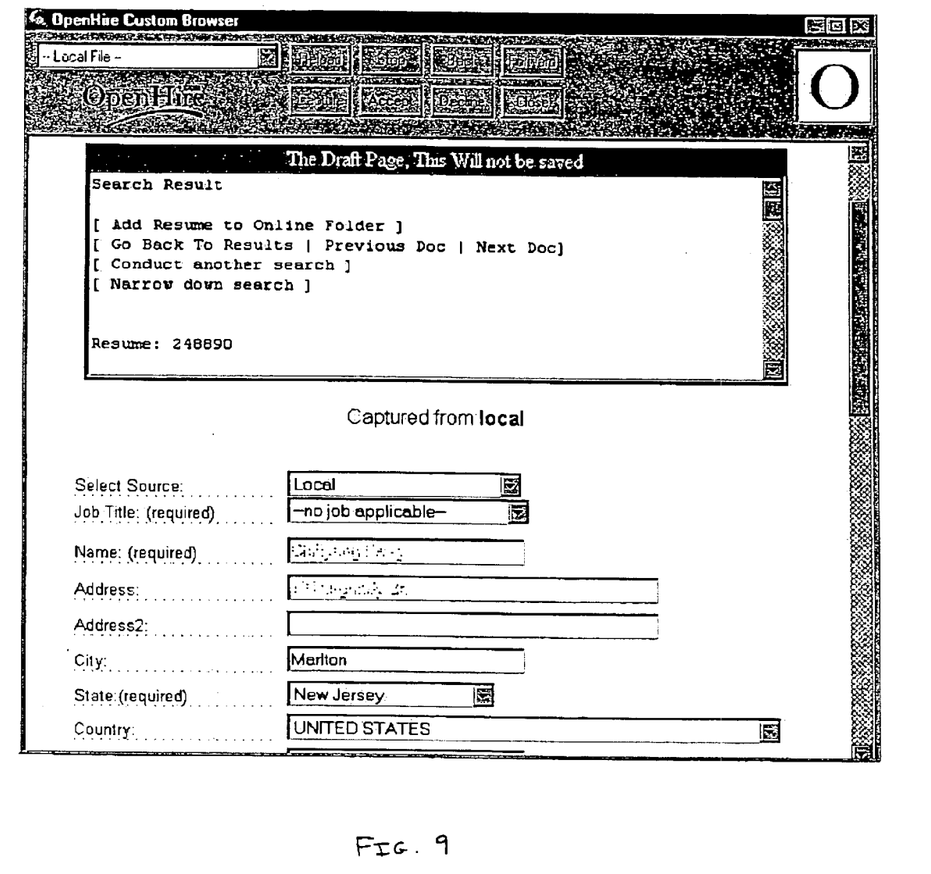
FIG. 9 shows another embodiment of the invention
Figure 10:
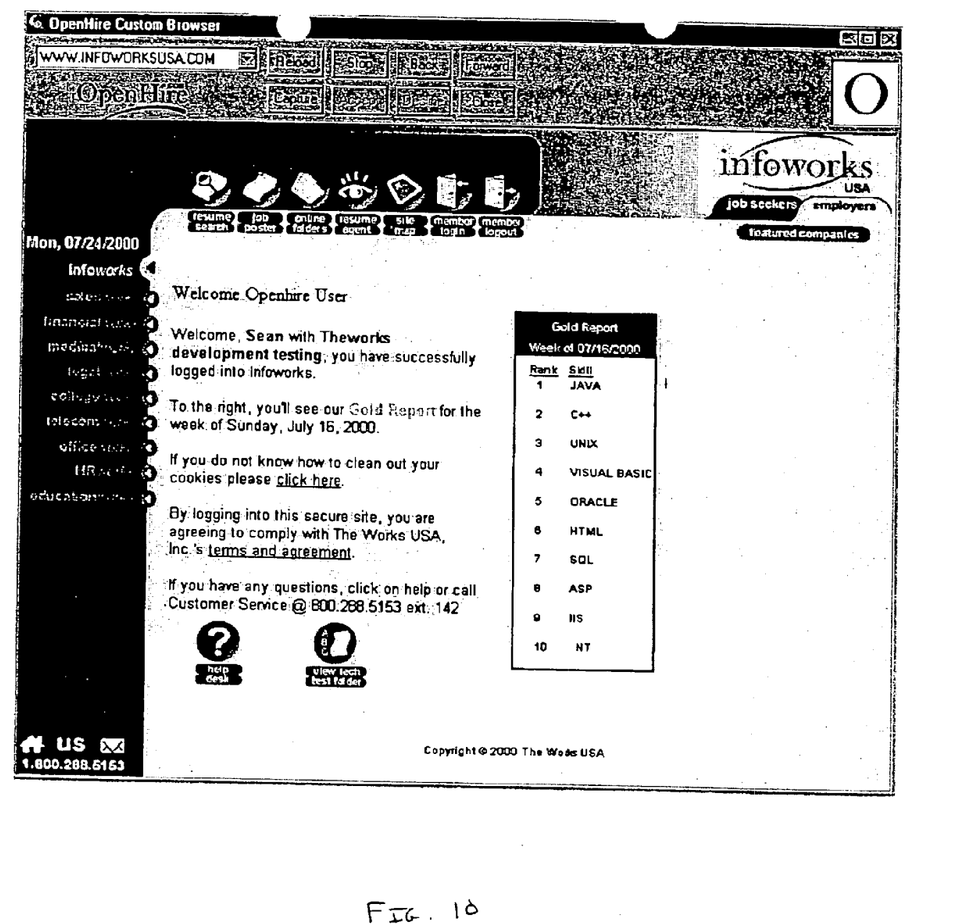
FIG. 10 shows another embodiment of the invention

In another embodiment, the client may determine where the application may be filed (stored). This may be decided when the job applicant information is capture. The client may store the captured resume in relation to the open positions for which the job applicants are applying. For example, if the job applicant is applying for a position as a cold fusion developer, the resume may be stored in a file which relates to that cold fusion developer position. As shown in FIG.8, the folder for the cold fusion developer position contains six resumes. The client may view the resumes received for the cold fusion developer position by selecting the "6" hyperlink under the "# of resumes". The resumes may listed by name of applicant or by a relevancy rank. The client may view a summary of the job applicant's qualifications or an image of the resume. The foldering process may be alter or change at any time by the client. Restrictions or user rights may used to provide control and security for the database.

Furthermore, the client may manually delete a selected resume. Alternatively, the client may configure the service provider to automatically delete a resume after a selected period of time from receipt (e.g., 180 days), or to save the resume indefinitely if desired.

In an embodiment of the present invention, the client may create a new job position or manage an existing position. The service provider may display an interactive screen for the client to control and perform certain operations which are described below. The service provider may allow a client to open a new position, edit the position, deactivate or delete a position.

In an embodiment oft he present invention, the service provider may limit the options/features provided to a client based on the agreement between the service provider and the client using the system. For example, if the company has not enable certain features of the resume tracking system, the service provider may not activated the feature which would instruct the program to allow the client to use that feature. Also, if the company has only paid the service provider to use the system and method to track a certain number of job openings or for certain amount of time, the service provider may prevent the client from using the service if the amount has been exceeded.

If the client indicates that a job position is to be added for tracking, the service provider may display a screen for the client to enter information pertaining to the position for which an applicant is being sought. For example, the screen display may include a form in which the client may enter the title of the position, the category of the position, a brief description of the position, and a detailed description of the position. This information may be used to inform people who review the resumes in the client's company of the qualifications requirements.

When the client enters the information, the service provider may store that information at a location in memory pertaining to that position which can be accessed with reference to that position. That information can also be stored with respect to the particular client within the company. Once the client has submitted the information the display screen will display a message indicating, for example, that the information has been received and stored. The information may be manipulate at anytime by a client with the proper authority. When the client indicates that the editing has been completed a message indicating that the information has been received and stored may be displayed.

The service provider may allow the client to track the status of job openings. For example, the service provider may provide the client with statistics regarding the client's open job positions. For example, the number of captured resumes for each position may be provide to the client and clicking the hyperlink the client may view the resumes collected for the position.

If a position becomes filled or the company is no longer interested in hiring a person for that position, the position can be deactivated manually by the client. Alternately, the service provider may be instructed to deactivate the position automatically based on information (e.g., the dates during which the position is to be active) entered by the client. The resumes stored in the deactivated folder may be archived or deleted.

We claim:

1. A service provider node comprising:
    a client program for accessing web, gopher and other Internet sites that allows a user to read documents and navigate between the documents stored in at least one resume warehouse;
    a communications link with the at least one resume warehouses;
    a communications link with at least one client;
    an application for retrieving job applicant data from the at least one resume warehouse, comprising:
        means for allowing the user to individually review and capture at least one resume warehouse document;
        means for automatically capturing the job applicant data from the at least one resume warehouse document; and
        means for automatically parsing the job applicant data captured from the at least one resume warehouse document; and
    an application for collecting the parsed job applicant data and storing the parsed job applicant data in a database, comprising:
        means for automatically importing the job applicant data parsed from the at least one resume warehouse into at least one template with at least one job applicant field, such that formatting of the at least one template matches the formatting of the at least one resume warehouse;
    whereby the job applicant data is stored in a format preserving its original appearance in the at least one resume warehouse.

2. A service provider node according to claim 1, wherein the client program is a proprietary browser.

3. A service provider node according to claim 1, wherein the database is local to the service provider.

4. A service provider node according to claim 1, wherein the job applicant data in the database is used to generate form letters.

5. A service provider node according to claim 1, further comprising:
    an application for tracking source information of the job applicant data.

6. A service provider node according to claim 5, wherein the application for tracking source information is used to track a headhunter's efficiencies.

7. A service provider node according to claim 4, wherein the from letters are communications with a job applicant.

8. The service provider node of claim 1, wherein duplicates of job applicant data are prevented.

9. The service provider node of claim 1, wherein cost-related information related to recruiting of job applicants is tracked.

10. The service provider node of claim 1, wherein the parsed job applicant data is searched and manipulated to track job applicant fields contained in the at least one template.

11. A method for resume storage and retrieval from multiple resume warehouses comprising the steps of:
    establishing a communications link between a service provider and at least one client;
    providing a client program for accessing web, gopher and other Internet sites that allows users to read documents and navigate between the documents stored in at least one resume warehouse;

establishing a communications link with the at least one resume warehouse;

retrieving job applicant data from the at least one resume warehouses, comprising:

capturing the job applicant data from at least one resume warehouse document, utilizing a capture button; and     automatically parsing the job applicant data captured from the at least one resume warehouse document, utilizing an import application; and collecting the parsed job applicant data and storing the parsed job applicant data in a database, comprising:

automatically importing the job applicant data parsed from the at least one resume warehouse document into at least one template with at least one job applicant field, utilizing an import application, such that formatting of the at least one template matches the formatting of the at least one resume warehouse document;

whereby the job applicant data is stored in a format preserving its original appearance in the at least one resume warehouse document.

12. The method of claim 11, further comprising:
utilizing the parsed job applicant data in the database to generate form letters.

13. The method of claim 11, further comprising:
tracking source information of the job applicant data.

14. The method of claim 11, further comprising:
tracking source information in order to track a headhunter's efficiencies.

15. The method of claim 11, further comprising:
determining if job applicant data has already been stored in the system to avoid parsing duplicate job applicant data.

16. The method of claim 11, further comprising:
tracking cost-related information related to recruiting of job applicants.

17. The method of claim 11, further comprising:
searching and manipulating the parsed job applicant data to track job applicant fields contained in the at least one template.

18. The method of claim 11, wherein the form letters are communications with the job applicants.

19. A computer program product comprising a computer usable medium having control logic stored therein for causing a computer to store and retrieve job applicant data, the control logic comprising:

first computer readable program means for establishing a communications link between a service provider and at least one client;

second computer readable program means for providing a client program for accessing web, gopher and other Internet sites that allows users to read documents and navigate between the documents stored in at least one resume warehouse;

third computer readable program means for establishing a communications link with the at least one resume warehouse;

fourth computer readable program means for retrieving job applicant data from the at least one resume warehouses, comprising:

fifth computer readable program means for capturing the job applicant data from at least one resume warehouse document, utilizing a capture button; and         sixth computer readable program means for automatically parsing the job applicant data captured from the at least one resume warehouse document, utilizing an import application; and     seventh computer readable program means for collecting the parsed job applicant data and storing the parsed job applicant data in a database, comprising:

eighth computer readable program means for automatically importing the job applicant data parsed from the at least one resume warehouse document into at least one template with at least one job applicant field, utilizing an import application, such that formatting of the at least one template matches the formatting of the at least one resume warehouse document;

whereby the job applicant data is stored in a format preserving its original appearance in the at least one resume warehouse document.

20. A service provider node, comprising:

a client program for accessing web, gopher, and other Internet sites that allow a user to read documents and navigate between the documents stored in at least one resume warehouse;

a communications link with the at least one resume warehouse;

a communications link with at least one client;

an application for retrieving job applicant data from the at least one resume warehouse, comprising:

a user interface comprising a capture button allowing the user to individually review and capture at least one resume warehouse document;

a capture application for automatically capturing the job application data from the at least one resume warehouse document; and     an import application for automatically parsing the job applicant data captured from the at least one resume warehouse document; and an application for collecting the parsed job applicant data and storing the parsed job applicant data in a database, comprising:

an import application for automatically importing the job applicant data parsed from the at least one resume warehouse into at least one template with at least one job applicant field, such that formatting of the at least one template matches the formatting of the at least one resume warehouse;

whereby the job applicant data is stored in a format preserving its original appearance in the at least one resume warehouse.

21. A service provider node according to claim 20, wherein the client program is a proprietary browser.

22. A service provider node according to claim 20, wherein the database is local to the service provider.

23. A service provider node according to claim 20, wherein the job applicant data in the database is used to generate form letters.

24. A service provider node according to claim 20, further comprising:

an application for tracking source information of the job applicant data.

25. A service provider node according to claim 24, wherein the application for tracking source information is used to track a headhunter's efficiencies.

26. A service provider node according to claim 23, wherein the form letters are communications with a job applicant.

\* \* \* \* \*